US012664736B2

(12) United States Patent (10) Patent No.: US 12,664,736 B2
Hsieh et al. (45) Date of Patent: Jun. 23, 2026

(54) IMAGE DISPLAYING METHOD, ELECTRONIC DEVICE, AND NON-TRANSITORY COMPUTER READABLE STORAGE MEDIUM

(71) Applicant: HTC Corporation, Taoyuan City (TW)

(72) Inventors: Heng-Li Hsieh, Taoyuan City (TW); Chun-Kai Huang, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 150 days.

(21) Appl. No.: 18/409,822

(22) Filed: Jan. 11, 2024

(65) Prior Publication Data

US 2024/0242446 A1 Jul. 18, 2024

Related U.S. Application Data

(60) Provisional application No. 63/479,730, filed on Jan. 12, 2023.

(51) Int. Cl.
| | |
|---|---|
| *G06T 19/00* | (2011.01) |
| *G06T 3/18* | (2024.01) |
| *G06T 5/50* | (2006.01) |
| *G06V 10/44* | (2022.01) |
| *G06V 30/10* | (2022.01) |

(52) U.S. Cl.
CPC .............. *G06T 19/006* (2013.01); *G06T 3/18* (2024.01); *G06T 5/50* (2013.01); *G06V 10/44* (2022.01); *G06V 30/10* (2022.01); *G06T 2207/20221* (2013.01)

(58) Field of Classification Search
CPC ....... G06T 19/006; G06T 11/60; G06V 20/20; G06V 10/44; G06F 3/013
See application file for complete search history.

(56) References Cited

U.S. PATENT DOCUMENTS

2019/0094981 A1* 3/2019 Bradski ................ G06V 40/168

FOREIGN PATENT DOCUMENTS

| CN | 103154972 A | * | 6/2013 | ........... G06T 19/006 |
|---|---|---|---|---|
| CN | 118331418 A | * | 7/2024 | ............. G06T 11/60 |
| KR | 20250148705 A | * | 10/2025 | ........... H04L 9/3247 |

* cited by examiner

*Primary Examiner* — Chante E Harrison
(74) *Attorney, Agent, or Firm* — CKC & Partners Co., LLC

(57) ABSTRACT

An image displaying method is disclosed. The image displaying method includes the following operations: capturing a first image of a real space by a camera based on a first viewing direction when the camera is located at a first camera position, wherein the first image includes a first text image; detecting a text region according to the first image by a processor, wherein the text region includes the first text image; recognizing the first text image to obtain a first text content by the processor; obtaining several first feature points of the text region according to the first image by the processor; creating a first virtual surface according to the several first feature points by the processor; and displaying a first virtual image with the first text content appending to the first virtual surface by a display circuit.

14 Claims, 10 Drawing Sheets

100

110  camera 130  processor 170  memory 150  display circuit

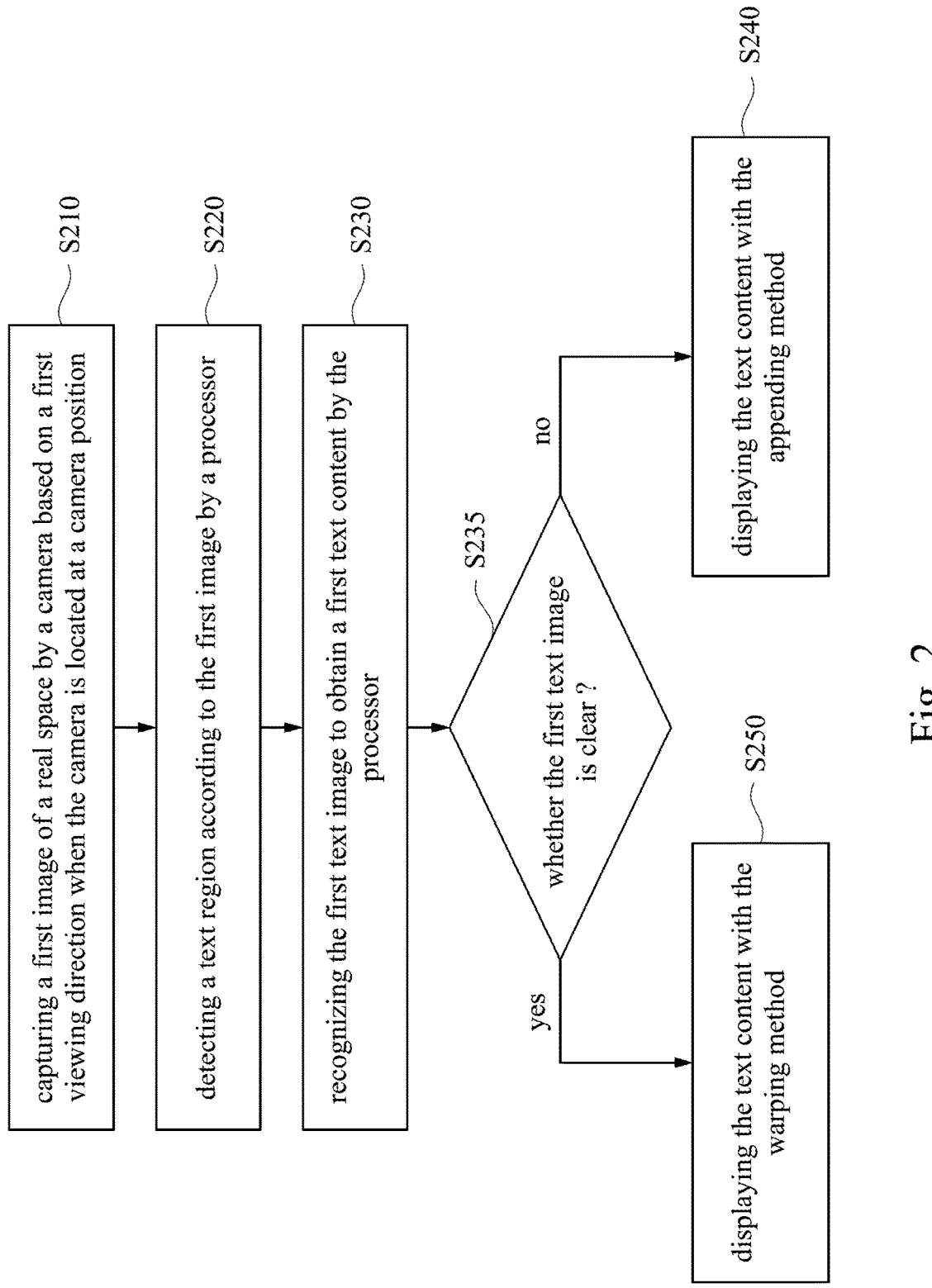

200

S210 capturing a first image of a real space by a camera based on a first viewing direction when the camera is located at a camera position

S220 detecting a text region according to the first image by a processor

S230 recognizing the first text image to obtain a first text content by the processor

S235 whether the first text image is clear ?

yes no

S250 displaying the text content with the warping method

S240 displaying the text content with the appending method

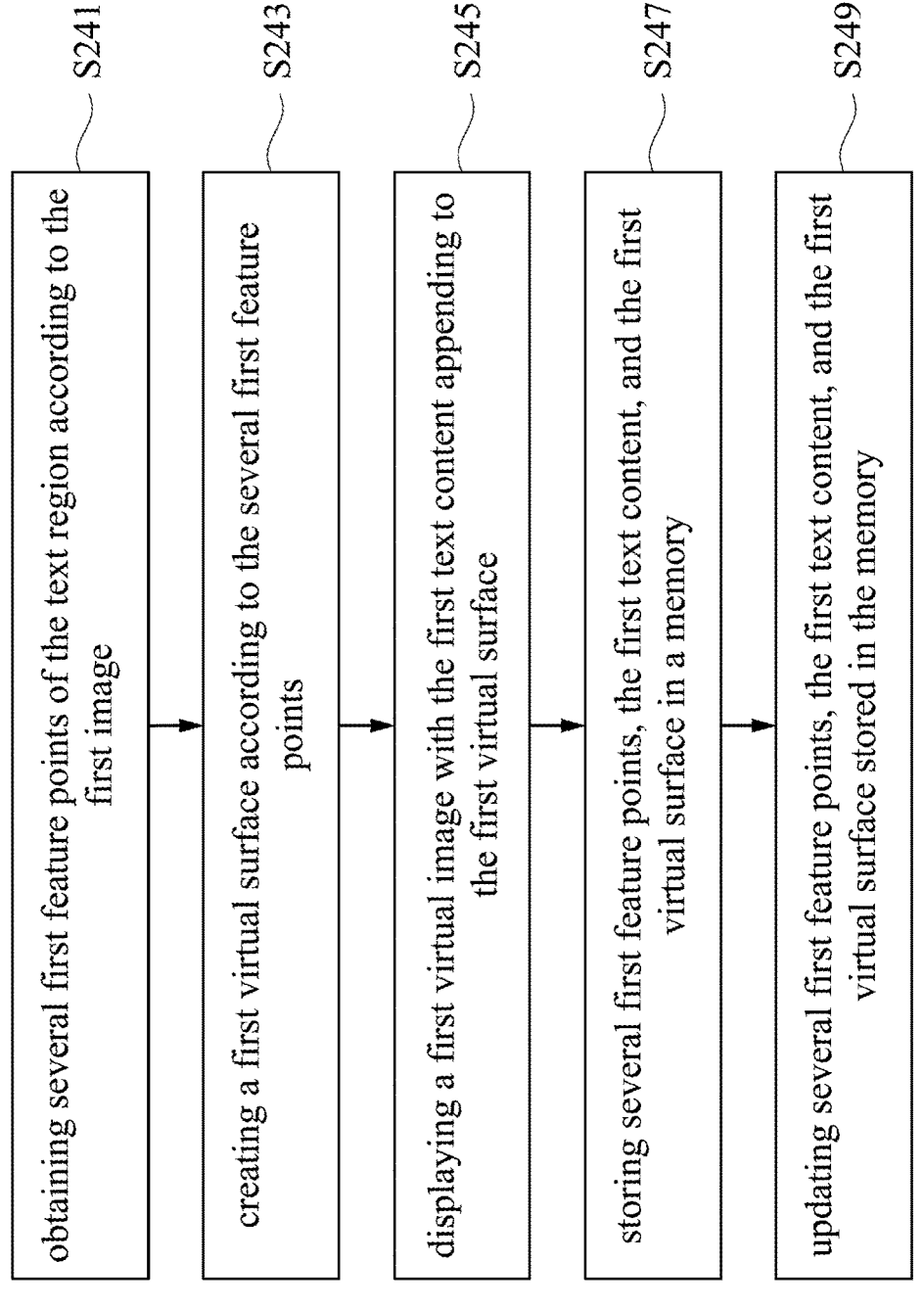

S240

S241 obtaining several first feature points of the text region according to the first image S243 creating a first virtual surface according to the several first feature points S245 displaying a first virtual image with the first text content appending to the first virtual surface S247 storing several first feature points, the first text content, and the first virtual surface in a memory S249 updating several first feature points, the first text content, and the first virtual surface stored in the memory

Fig. 5

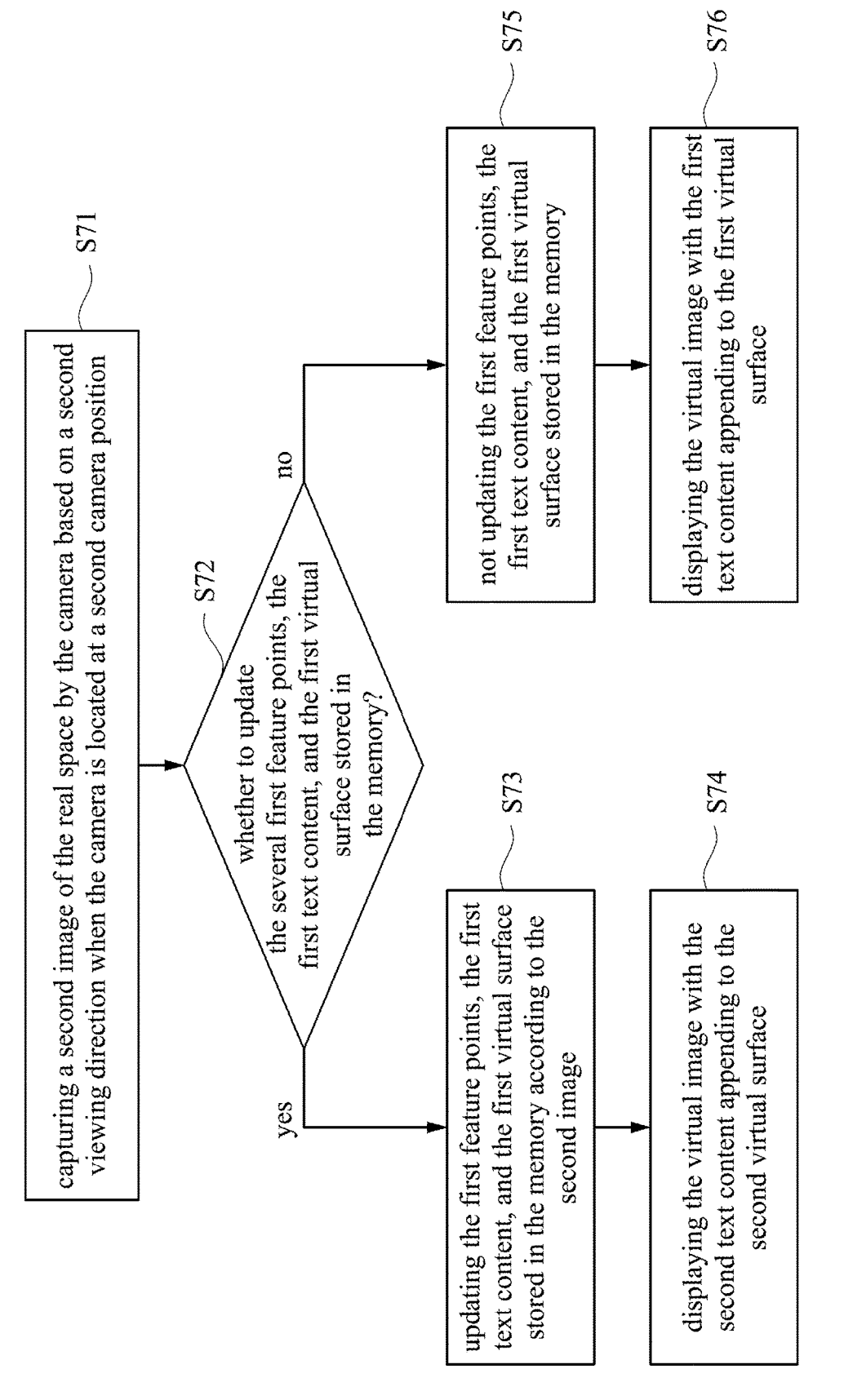

S249 capturing a second image of the real space by the camera based on a second viewing direction when the camera is located at a second camera position — S71

S72 whether to update the several first feature points, the first text content, and the first virtual surface stored in the memory?

no not updating the first feature points, the first text content, and the first virtual surface stored in the memory — S75 displaying the virtual image with the first text content appending to the first virtual surface — S76 yes updating the first feature points, the first text content, and the first virtual surface stored in the memory according to the second image — S73 displaying the virtual image with the second text content appending to the second virtual surface — S74

IMAGE DISPLAYING METHOD, ELECTRONIC DEVICE, AND NON-TRANSITORY COMPUTER READABLE STORAGE MEDIUM

CROSS-REFERENCE TO RELATED APPLICATION

This application claims priority to U.S. Provisional Application Ser. No. 63/479,730, filed Jan. 12, 2023, which is herein incorporated by reference.

BACKGROUND

Field of Invention

The present application relates to an image displaying method, an electronic device, and a non-transitory computer readable storage medium. More particularly, the present application relates to an image displaying method, an electronic device, and a non-transitory computer readable storage medium with pass through views.

Description of Related Art

Head mounted displays ("HMDs") or head wearable displays are display devices that are worn on or around the head. HMDs typically create an enlarged virtual image located several meters in front of the user, for example, on a display circuit of the HMDs.

In order to allow users to operate HMD in a real space, several methods for providing the pass through views (or see through views/pass through images) are provided. Since the camera video or the image of the real space captured by the camera of the HMD device is directly used as the pass through input for the pass through views, the clearness of the pass through view becomes more critical to the user. The clearness of the pass through view is not just for user safety but also to increase the usage time of the HMD. The weak clearness makes the details, like the text, unclear. How to increase the clearness of the text within the pass through image is a problem to be solved.

SUMMARY

The disclosure provides an image displaying method. The image displaying method includes the following operations: capturing a first image of a real space by a camera based on a first viewing direction when the camera is located at a first camera position, wherein the first image includes a first text image; detecting a text region according to the first image by a processor, wherein the text region includes the first text image; recognizing the first text image to obtain a first text content by the processor; obtaining several first feature points of the text region according to the first image by the processor; creating a first virtual surface according to the several first feature points by the processor; and displaying a first virtual image with the first text content appending to the first virtual surface by a display circuit.

The disclosure provides an electronic device. The electronic device includes a camera, a processor, and a display circuit. The camera is configured to capture a first image of a real space based on a first viewing direction when the camera is located at a first camera position, wherein the first image includes a first text image. The processor is coupled to the camera. The processor is configured to: detect a text region according to the first image, in which the text region includes the first text image; recognize the first text image to obtain a first text content; obtain several first feature points of the text region according to the first image; and create a first virtual surface according to the several first feature points. The display circuit is coupled to the processor. The display circuit is configured to display a first virtual image with the first text content appending to the first virtual surface.

The disclosure provides a non-transitory computer readable storage medium with a computer program to execute aforesaid image displaying method.

It is to be understood that both the foregoing general description and the following detailed description are by examples and are intended to provide further explanation of the invention as claimed.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

FIG. 2 is a flowchart illustrating an image displaying method in accordance with some embodiments of the present disclosure.

FIG. 5 is a flowchart illustrating an operation of the image displaying method 200 as illustrated in FIG. 2 in accordance with some embodiments of the present disclosure.

FIG. 7 is a flowchart illustrating an operation as illustrated in FIG. 5 in accordance with some embodiments of the present disclosure.

DETAILED DESCRIPTION

Figure 1:
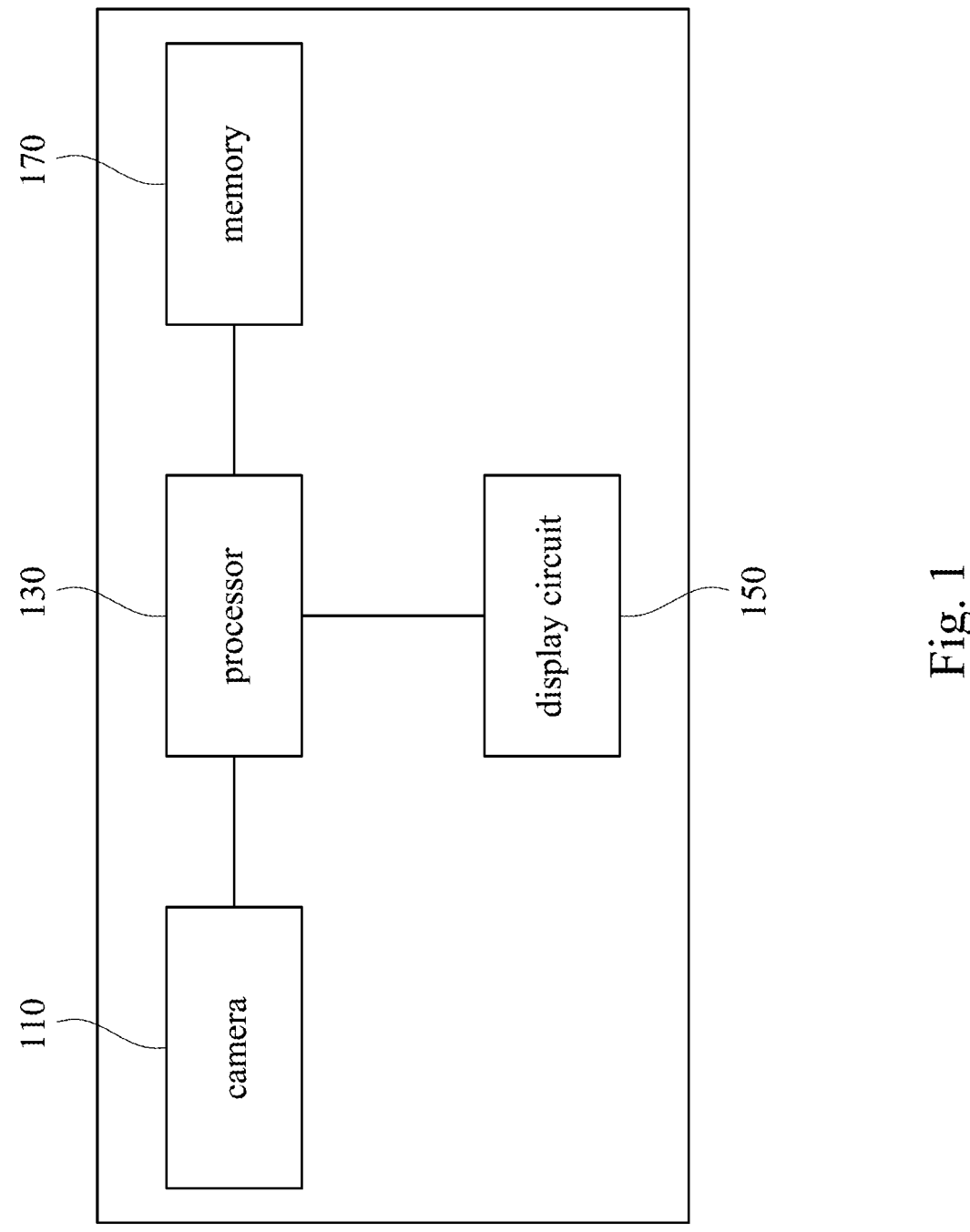
FIG. 1 is a schematic block diagram illustrating an electronic device in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

Reference is made to FIG. 1. FIG. 1 is a schematic block diagram illustrating an electronic device 100 in accordance with some embodiments of the present disclosure. As illustrated in FIG. 1, the electronic device 100 includes a camera 110, a processor 130, a display circuit 150, and a memory 170. The camera 110, the display circuit 150, and the memory 170 couple to the processor 130 respectively. One or more programs are stored in the memory 170 and configured to be executed by the processor 130, in order to perform an image displaying method.

In some embodiments, the electronic device 100 may be an HMD (head-mounted display) device. The HMD device may be wear on the head of a user.

In some embodiments, the electronic device 100 may be configured to perform a SLAM system. The SLAM system includes operations such as image capturing, features extracting from the image, and localizing according to the features. In some embodiments, the electronic device 100 includes a SLAM system with a SLAM algorithm. The details of the SLAM system will not be described herein.

Specifically, in some embodiments, the electronic device 100 may be applied in a virtual reality (VR)/mixed reality (MR)/augmented reality (AR) system. For example, the electronic device 100 may be realized by, a standalone head mounted display device (HMD) or VIVE HMD. In detail, the standalone HMD or VIVE HMD may handle such as processing location data of position and rotation, graph processing or others data calculation.

In some embodiments, the processor 130 can be realized by, for example, one or more processing circuits, such as central processing circuits and/or micro processing circuits, but are not limited in this regard. In some embodiments, the memory 170 includes one or more memory devices, each of which includes, or a plurality of which collectively include a non-transitory computer readable storage medium. The non-transitory computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

The camera 110 is configured to capture one or more images of the real space that the electronic device 100 is operated. In some embodiments, the camera 110 may be realized by a camera circuit device or any other camera circuit with image capture functions.

The display circuit 150 is electrically connected to the processor 130, such that the video and/or audio content displayed by the display circuit 150 is controlled by the processor 130. In some embodiments, the display circuit 150 covers a field of view of the user and shows a virtual image at the field of view of the user.

In some embodiments, the display circuit 150 provides a pass through image or a see through image, or a virtual image with pass through views.

It is noted that, the embodiments shown in FIG. 1 is merely an example and not meant to limit the present disclosure.

Reference is made to FIG. 2. For better understanding of the present disclosure, the detailed operation of the electronic device 100 as illustrated in FIG. 1 will be discussed in accompanying with the embodiments shown in FIG. 2. FIG. 2 is a flowchart illustrating an image displaying method 200 in accordance with some embodiments of the present disclosure. It should be noted that the image displaying method 200 can be applied to an electrical device having a structure that is the same as or similar to the structure of the electronic device 100 shown in FIG. 1. To simplify the description below, the embodiments shown in FIG. 1 will be used as an example to describe the image displaying method 200 in accordance with some embodiments of the present disclosure. However, the present disclosure is not limited to application to the embodiments shown in FIG. 1.

As shown in FIG. 2, the image displaying method 200 includes operations S210 to S250.

In operation S210, a first image of a real space is captured by a camera based on a first viewing direction when the camera is located at a first camera position. The first image of the real space includes a first text image.

Figure 3:
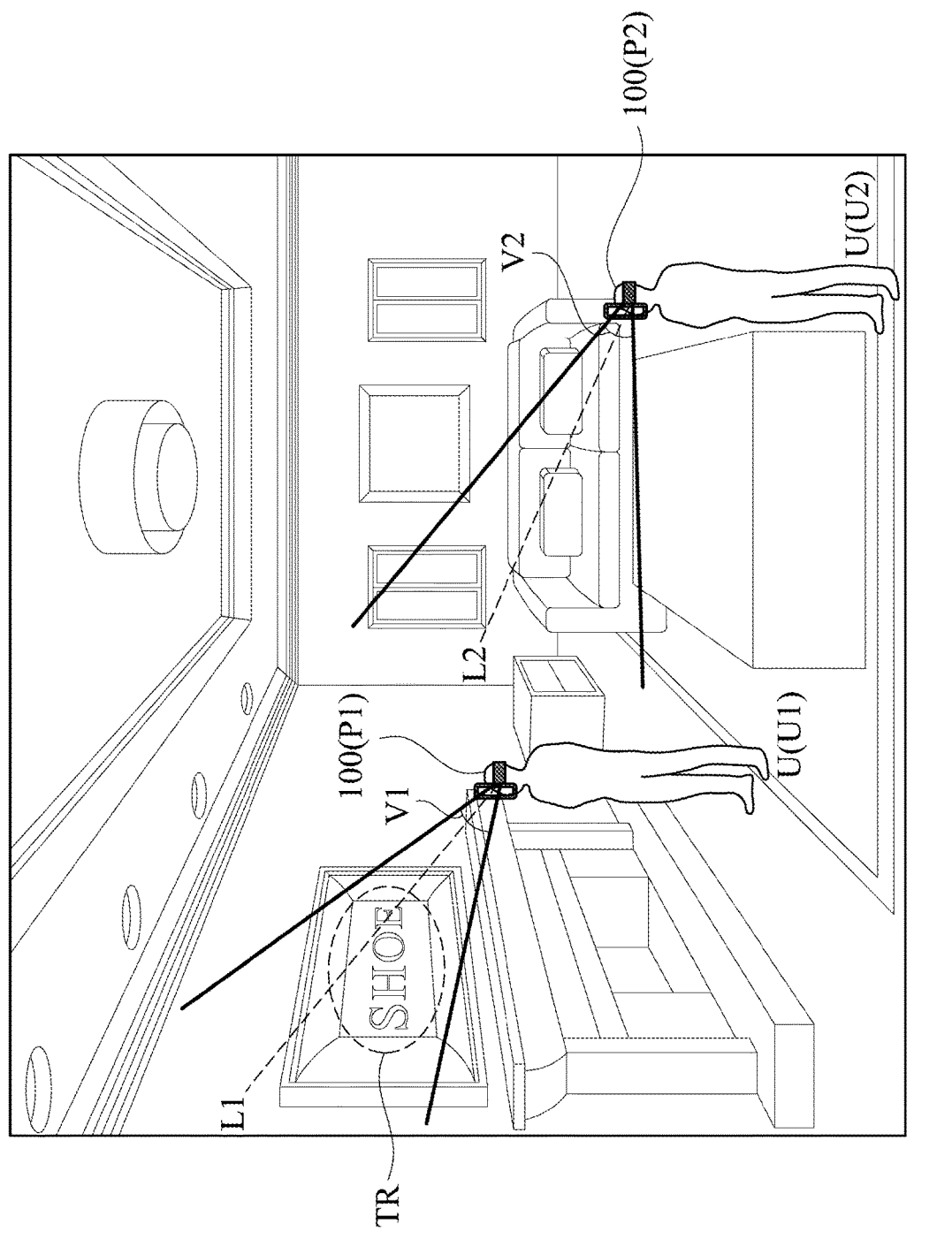
FIG. 3 is a schematic diagram illustrating a user operating an electronic device in accordance with some embodiments of the present disclosure.

Reference is made to FIG. 3 together. FIG. 3 is a schematic diagram illustrating a user U operating the electronic device 100 as illustrated in FIG. 1 in accordance with some embodiments of the present disclosure.

As illustrated in FIG. 3, the user is wearing the electronic device 100 on the head of the user U. In some embodiments, the processor 130 as illustrated in FIG. 1 obtains several space feature points of the real space R. According to the several space feature points of the real space R, the processor 130 establishes a mixed reality environment coordinate system in correspondence to the real space R with the SLAM system.

For an example as illustrated in FIG. 3, when the user U is standing at position U1 of the real space R, the camera 110 as illustrated in FIG. 1 is located at the camera position P1 of the mixed reality environment coordinate system. When the user U is standing at the position U2 of the real space R, the camera 110 is located at the camera position P2 of the mixed reality environment coordinate system.

As illustrated in FIG. 3, in some embodiments, when the user U is standing at the position U1 of the real space R, the camera 110 captures an image of the real space R based on a viewing direction L1 and a viewing angle V1.

Figure 4:
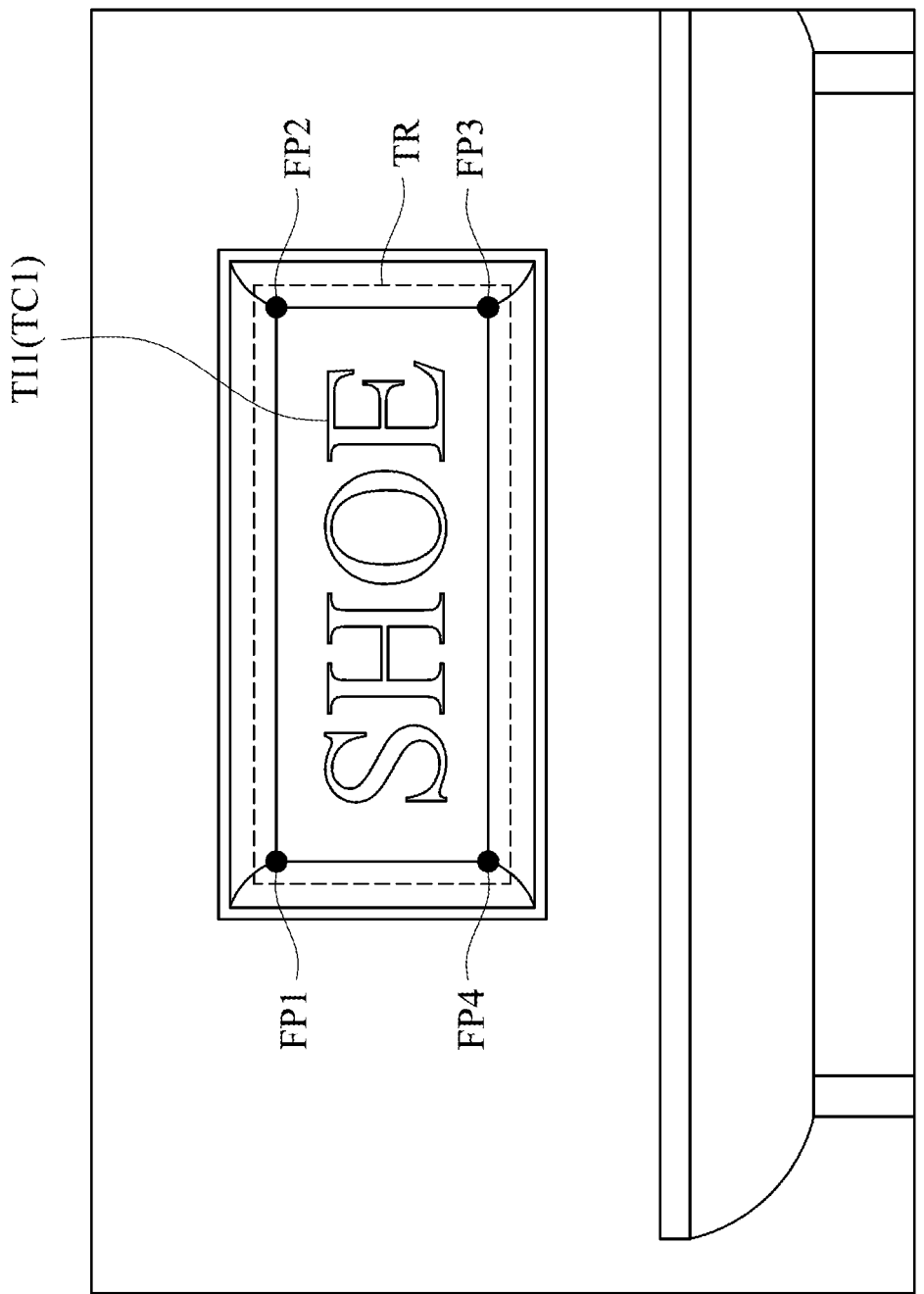
FIG. 4 is a schematic diagram illustrating an image of the real space in accordance with some embodiments of the present disclosure.

Reference is made to FIG. 4. FIG. 4 is a schematic diagram illustrating an image 400 of the real space R in accordance with some embodiments of the present disclosure. The image 400 of the real space R is captured by the camera 110 based on the viewing direction L1 and the viewing angle V1 when the camera 110 is located at the camera position P1.

In some embodiments, the camera 110 captures several frames of the images of the real space R, and the video including the several frames of the images captured is input to the processor 130 for further operations. In some embodiments, the video is displayed by the display circuit 150 so that the user U as illustrated in FIG. 3 could see the images of the real space R.

Reference is made to FIG. 2 again. In operation S220, a text region is detected according to the first image by a processor. The text region includes the first text image.

Reference is made to FIG. 1 and FIG. 4 together. In some embodiments, according to the image 400, the processor 130 as illustrated in FIG. 1 detects a text region TR. As illustrated in FIG. 4, the text region TR includes a text image TI1. In some embodiments, the text region TR is a region within the real space which includes the text in reality. In some embodiments, the text region TR is a region surrounding the text in reality. In some embodiments, the processor 130 as illustrated in FIG. 1 detects the text and circles the area around the text so as to define the text region.

In operation S230, the first text image is recognized to obtain the first text content by the processor.

Reference is made to FIG. 1 and FIG. 4 together. In some embodiments, according to the text image TI1, the processor 130 as illustrated in FIG. 1 recognizes the text image TI1 to obtain the text content TC1 of "SHOE". In some embodiments, the text content is recognized by with a text recovering model including a machine learning model.

In operation S235, it is determined whether the first text image is clear. In some embodiments, whether the text image is clear is determined by the processor 130 as illustrated in FIG. 1. When the text image is not clear, operation S240 is performed. When the text image is clear, operation S250 is performed.

In some embodiments, the processor 130 as illustrated in FIG. 1 determines whether the text image is clear when displaying the video captured by the camera 110. In some embodiments, when the text image is recognizable or readable, it is determined that the text image is clear. On the other hand, when the text image is unrecognizable or unreadable, it is determined that the text image is not clear.

In operation S240, the text content is displayed with the appending method. In some embodiments, operation S240 is performed by the processor 130 as illustrated in FIG. 1.

Reference is made to FIG. 5 together. FIG. 5 is a flowchart illustrating the operation S240 of the image displaying method 200 as illustrated in FIG. 5 in accordance with some embodiments of the present disclosure. As illustrated in FIG. 5, the operation S240 includes operations S241 to S249.

In operation S241, several first feature points of the text region are obtained according to the first image. Reference is made to FIG. 1 and FIG. 4 together. In some embodiments, the processor 130 as illustrated in FIG. 1 obtains several feature points FP1, FP2, FP3, and FP4 of the text region TR according to the image 400. In some embodiments, the processor 130 as illustrated in FIG. 1 further obtains the position of each of the feature points FP1, FP2, FP3, FP4 in the mixed reality environment coordinate system.

The feature points FP1 to FP4 may be an object or any other features within the real space R within the text region TR.

Figure 6:
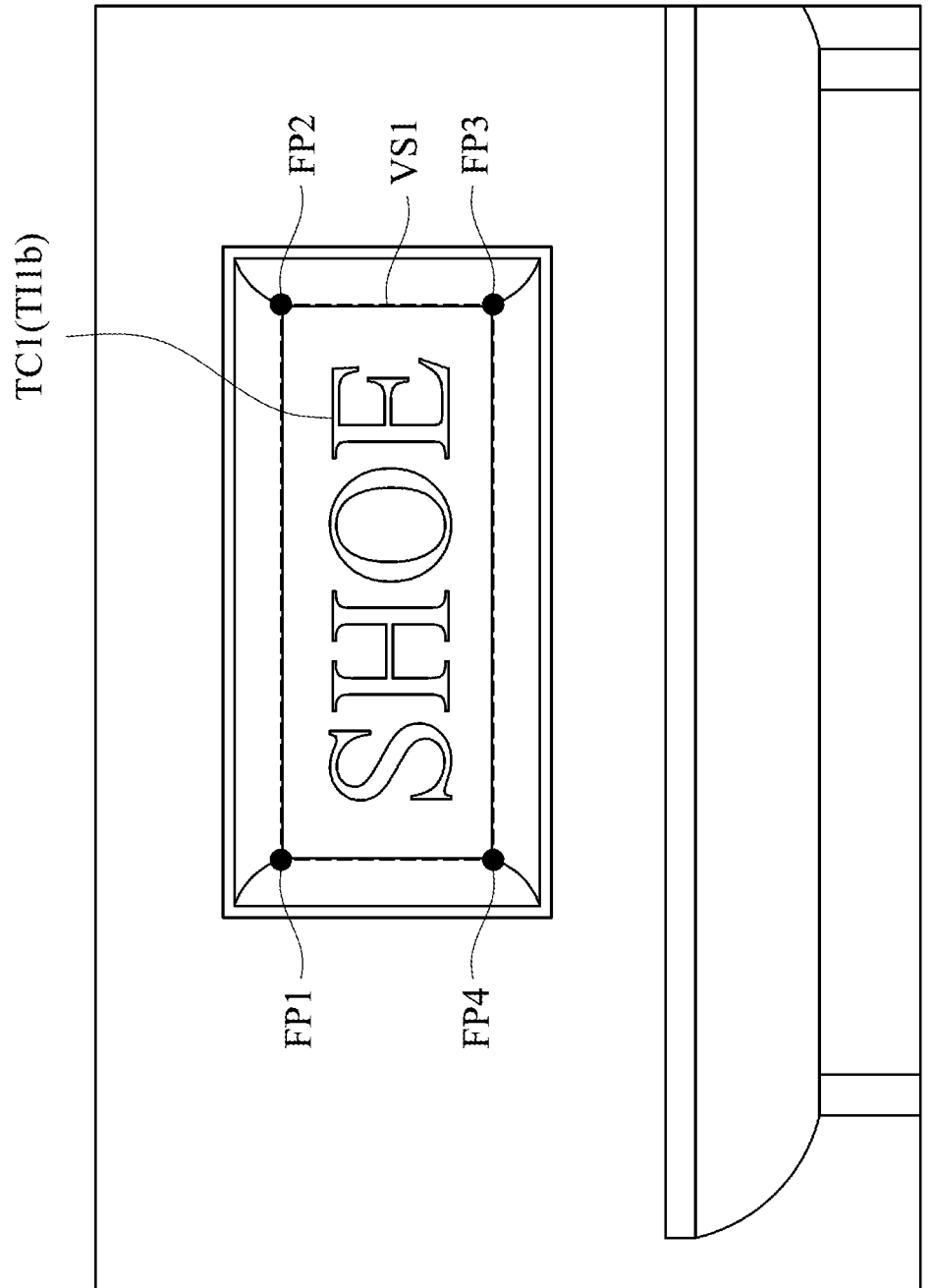
FIG. 6 is a schematic diagram illustrating a virtual image displayed by the display circuit in accordance with some embodiments of the present disclosure.

Reference is made to FIG. 5 again. In operation S243, a first virtual surface is created according to the several first feature points. Reference is made to FIG. 1 and FIG. 6 together. FIG. 6 is a schematic diagram illustrating a virtual image 600 displayed by the display circuit 150 in accordance with some embodiments of the present disclosure.

In some embodiments, the processor 130 as illustrated in FIG. 1 creates a virtual surface VS1 according to the feature points FP1, FP2, FP3, and FP4. In some embodiments, the processor 130 creates the virtual surface VS1 according to the positions of the feature points FP1, FP2, FP3, and FP4 in the mixed reality environment coordinate system. The virtual surface VS1 may be a flat surface, a wavy surface, a curved surface, or any other kinds of surfaces.

Reference is made to FIG. 5 again. In operation S245, a first virtual image is displayed with the first text content appending to the first virtual surface. Reference is made to FIG. 1 and FIG. 6 together. In some embodiments, the processor 130 as illustrated in FIG. 1 displays the virtual image 600 with the text content TC1 appending to the virtual surface VS1, as illustrated in FIG. 6.

In some embodiments, the processor 130 as illustrated in FIG. 1 further generates the text image TI1b according to the text content TC1 of "SHOE", and the processor 130 generates the virtual image 600 with the text image TI1b appending to the virtual surface VS1. That is, the text image TI1b is shown in the virtual surface VS1. In some embodiments, the display circuit 150 as illustrated in FIG. 1 displays the virtual image 600.

In some embodiments, the virtual image 600 can be generated by VR (virtual reality), MR (mixed reality), or AR (augmented reality).

Reference is made to FIG. 5 again. In operation S247, several first feature points, the first text content, and the first virtual surface are stored in a memory. Reference is made to FIG. 6 together. In some embodiments, the feature points FP1, FP2, FP3, and FP4, the text content TC1, and the virtual surface VS1 created according to the feature points FP1, FP2, FP3, and FP4 are stored in the memory 170 as illustrated in FIG. 1.

In operation S249, several first feature points, the first text content, and the first virtual surface stored in the memory are updated. In some embodiments, operation S249 is performed by the processor 130 as illustrated in FIG. 1. In some embodiments, operation S249 is performed periodically.

Reference is made to FIG. 7 together. FIG. 7 is a flowchart illustrating the operation S249 as illustrated in FIG. 5 in accordance with some embodiments of the present disclosure. As illustrated in FIG. 7, the operation S249 includes operations S71 to S76.

In operation S71, a second image of the real space is captured by the camera based on a second viewing direction when the camera is located at a second camera position. The second image includes the text region and a second text image.

Reference is made to FIG. 1 and FIG. 3 together. In some embodiments, when the user U is standing at the position U2, the camera 110 as illustrated in FIG. 1 captures an image of the real space R based on the viewing direction L2 and the viewing angle V2 when the camera 110 is located at the camera position P2.

Figure 8:
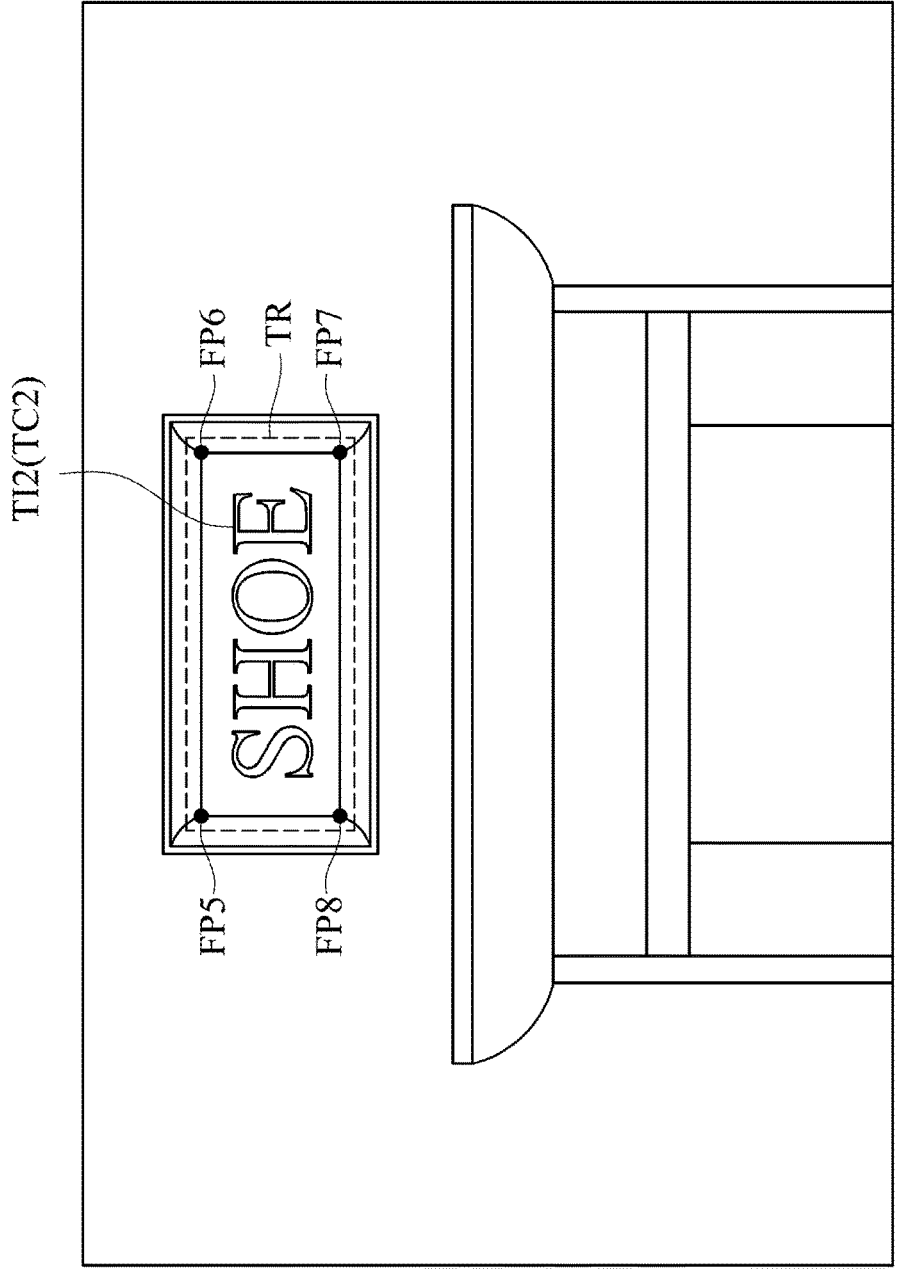
FIG. 8 is a schematic diagram illustrating another image of the real space R in accordance with some embodiments of the present disclosure.

Reference is made to FIG. 8 together. FIG. 8 is a schematic diagram illustrating another image 800 of the real space R in accordance with some embodiments of the present disclosure. The image 800 of the real space R is captured by the camera 110 based on the viewing direction L2 and the viewing angle V2 when the camera 110 is located at the camera position P2 as illustrated in FIG. 3. As illustrated in FIG. 8, the image 800 includes the text region TR.

The text region TR of the image 800 and the text region TR of the image 400 are the same since the text region TR is a region of the real space.

Similar to the image 400 as illustrated in FIG. 4, the image 800 as illustrated in FIG. 8 includes the feature points FP5 to FP8, the text image TI2, and the text content TC2.

Reference is made to FIG. 7 again. In operation S72, it is determined whether to update the several first feature points, the first text content, and the first virtual surface stored in the memory. When it is determined to update the several first feature points, the first text content, and the first virtual surface stored in the memory, operation S73 is performed. When it is determined not to update the several first feature points, the first text content, and the first virtual surface stored in the memory, operation S75 is performed.

In some embodiments, in operation S72, the processor 130 as illustrated in FIG. 1 determines to update the several feature points FP1 to FP4, the text content TC1, and the virtual surface VS1 stored in the memory 170 of FIG. 1 according to the image 800 when the viewing direction L2 is more orthogonal to the virtual surface VS1 compared to the viewing direction L1. On the contrary, when the viewing direction L2 is not more orthogonal to the virtual surface VS1 compared to the viewing direction L1, the processor 130 determines not to update the several feature points FP1 to FP4, the text content TC1, and the virtual surface VS1 stored in the memory 170.

Figure 9:
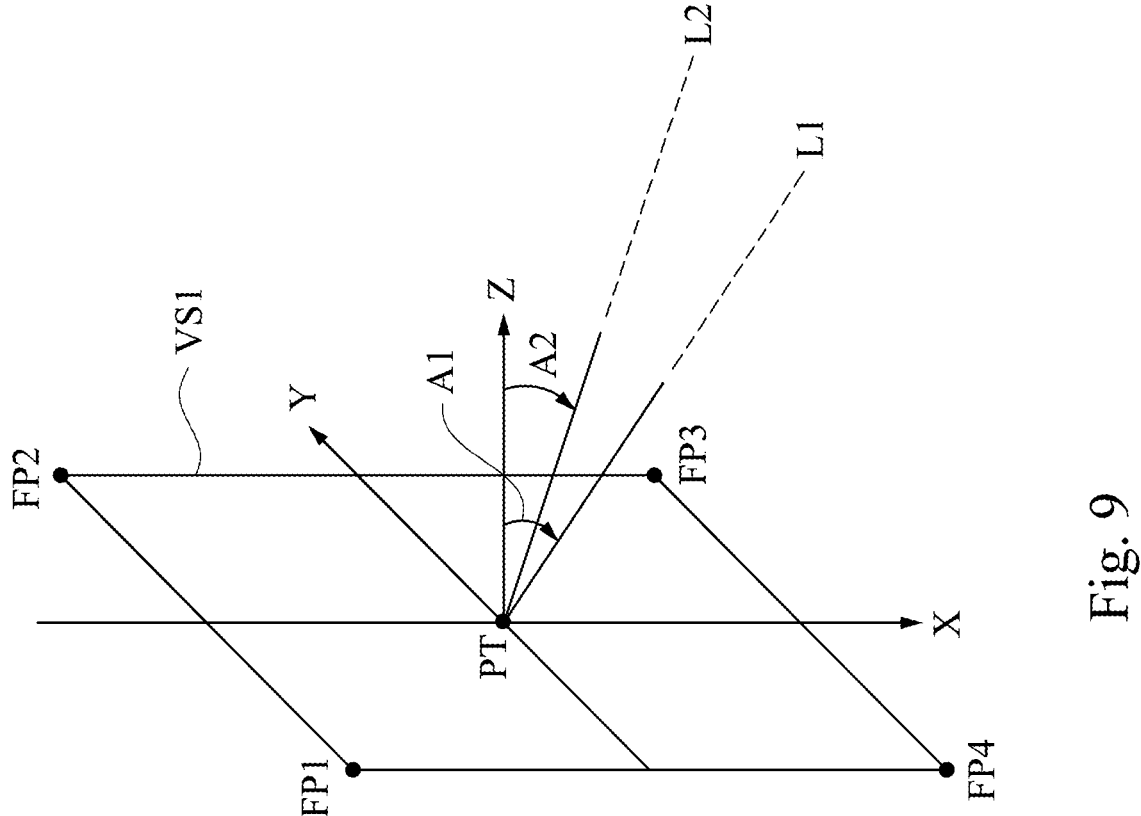
FIG. 9 is a schematic diagram illustrating a comparison between the viewing direction and the viewing direction as illustrated in FIG. 3 in accordance with some embodiments of the present disclosure.

Reference is made to FIG. 9 together. FIG. 9 is a schematic diagram illustrating a comparison between the viewing direction L1 and the viewing direction L2 as illustrated in FIG. 3 in accordance with some embodiments of the present disclosure. As illustrated in FIG. 9, both of the viewing direction L1 and the viewing direction L2 intersect with the virtual surface VS1 at the point PT. However, in some other embodiments, the viewing direction L1 and the viewing direction L2 may intersect with the virtual surface VS1 at different points.

As illustrated in FIG. 9, a direction Z is perpendicular to the virtual surface VS1. The smaller the angle between the viewing direction and the direction Z, the more orthogonal the viewing direction is relative to the virtual surface VS1. Since the angle A2 between the viewing direction L2 and the direction Z is smaller than the angle A1 between the viewing direction L1 and the direction Z, it is determined that the viewing direction L2 is more orthogonal to the virtual surface VS1 comparing to the viewing direction L1. Therefore, the processor 130 determines to update the several feature points FP1 to FP4, the text content TC1, and the virtual surface VS1 stored in the memory 170 of FIG. 1 according to the image 800.

In some other embodiments, in operation S72, the processor 130 as illustrated in FIG. 1 determines to update the several feature points FP1 to FP4, the text content TC1, and the virtual surface VS1 stored in the memory 170 of FIG. 1 according to the image 800 when the ratio between the text image TI1 and the image 400 as illustrated in FIG. 4 is smaller than the ratio between the text image TI2 and the image 800 as illustrated in FIG. 8. On the contrary, when the ratio between the text image TI1 and the image 400 as illustrated in FIG. 4 is not smaller than the ratio between the text image TI2 and the image 800 as illustrated in FIG. 8, the processor 130 determines not to update the several feature points FP1 to FP4, the text content TC1, and the virtual surface VS1 stored in the memory 170.

In some other embodiments, in operation S72, the processor 130 as illustrated in FIG. 1 determines to update the several feature points FP1 to FP4, the text content TC1, and the virtual surface VS1 stored in the memory 170 of FIG. 1 according to the image 800 when a ratio between the text image TI2 and the image 800 as illustrated in FIG. 8 is not smaller than a ratio threshold. On the contrary, the processor 130 as illustrated in FIG. 1 determines not to update the several feature points FP1 to FP4, the text content TC1, and the virtual surface VS1 stored in the memory 170 of FIG. 1 according to the image 800 when a ratio between the text image TI2 and the image 800 as illustrated in FIG. 8 is smaller than the ratio threshold.

In some other embodiments, in operation S72, the processor 130 as illustrated in FIG. 1 determines to update the several feature points FP1 to FP4, the text content TC1, and the virtual surface VS1 stored in the memory 170 of FIG. 1 according to the image 800 when a reliability of the text content TC2 obtained from the image 800 is higher than a reliability of the text content TC1 obtained from the image 400. On the contrary, when the reliability of the text content TC2 obtained from the image 800 is not higher than the reliability of the text content TC1 obtained from the image 400, the processor 130 determines not to update the several feature points FP1 to FP4, the text content TC1, and the virtual surface VS1 stored in the memory 170.

In operation S73, the first feature points, the first text content, and the first virtual surface stored in the memory are updated according to the second image. In some embodiments, in operation S73, the first feature points, the first text content, and the first virtual surface stored in the memory are updated by replacing the first feature points, the first text content, and the first virtual surface stored in the memory by the second feature points, the second text content, and the second virtual surface.

Reference is made to FIG. 1, FIG. 4, FIG. 6 and FIG. 8 together. In some embodiments, in operation S73, the memory 170 updates the stored data by replacing the stored feature points FP1 to FP4, the text content TC1, and the virtual surface VS1 by the feature points FP5 to FP8, the text content TC2, and the virtual surface (not shown) created according to the feature points FP5 to FP8.

In some embodiments, in operation S73, the processor 130 as illustrated in FIG. 1 recognizes the text image TI2 of the image 800 to obtain the text content TC2. The processor 130 obtains the feature points FP5 to FP8 of the text region TR according to the image 800. The processor 130 creates a virtual surface (not shown) according to the feature points FP5 to FP8.

Then, the processor 130 stores the feature points FP5 to FP8, the text content TC2, and the virtual surface (not shown) created according to the feature points FP5 to FP8 in the memory 170. In some embodiments, the processor 130 creates the virtual surface according to the positions of the feature points FP5, FP6, FP7, and FP8 in the mixed reality environment coordinate system. The virtual surface may be a flat surface, a wavy surface, a curved surface, or any other kinds of surfaces.

In operation S74, the virtual image is displayed with the text content TC2 appending to the virtual surface, which is created according to the feature points FP5 to FP8, by the display circuit 150.

In operation S75, the first feature points, the first text content, and the first virtual surface stored in the memory are not updated. That is, the feature points FP1 to FP4, the text content TC1, and the virtual surface VS1 remain the memory 170.

In operation S76, the virtual image is displayed with the text content TC1 appending to the virtual surface VS1, which is created according to the feature points FP1 to FP4, by the display circuit 150. That is, even the user U is standing at the position U2 as illustrated in FIG. 3, the display circuit 150 as illustrated in FIG. 1 displays the virtual image according to the text content TC1 and the feature points FP1 to FP4.

Figure 10:
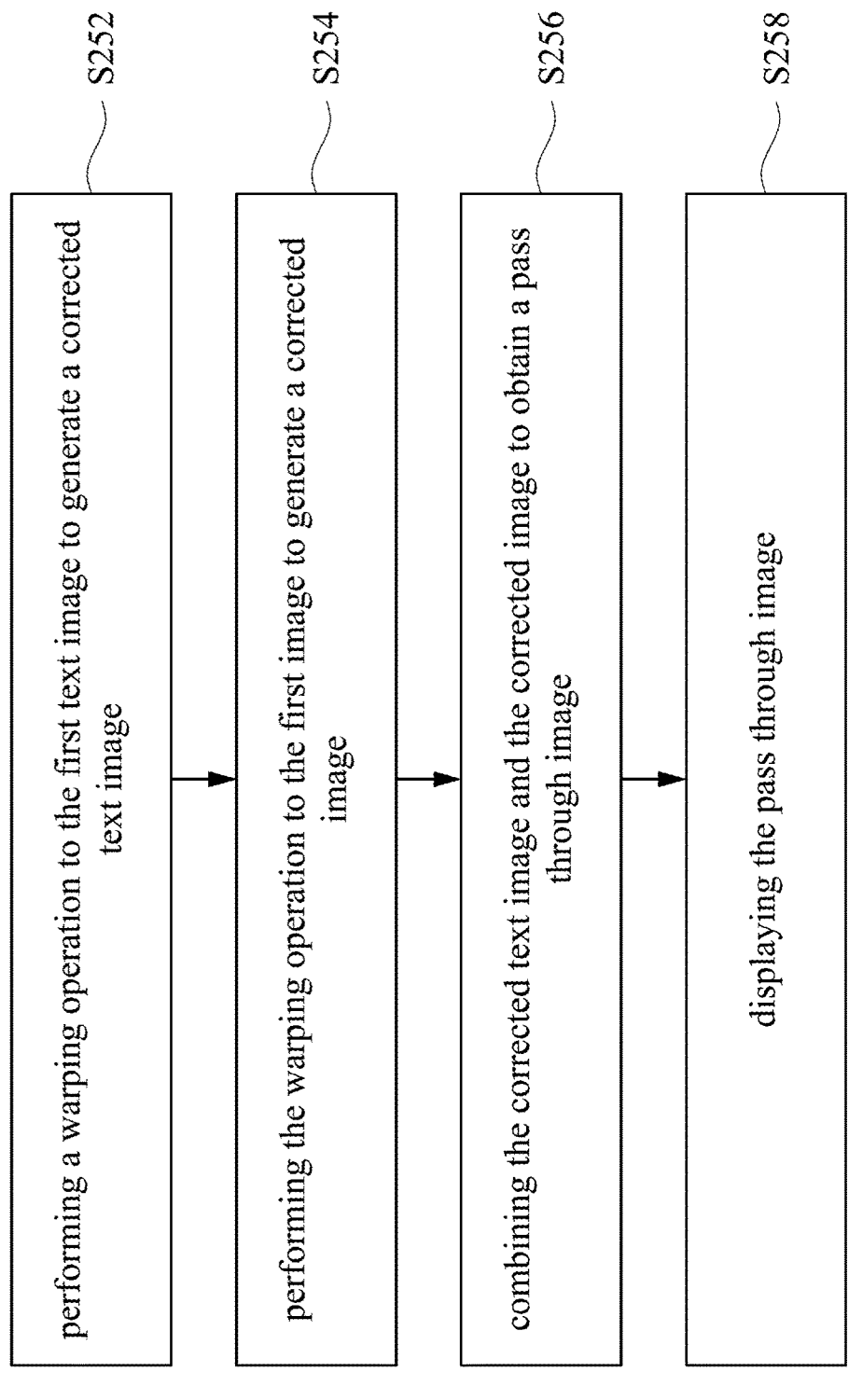
FIG. 10 is a flowchart illustrating an operation as illustrated in FIG. 2 in accordance with some embodiments of the present disclosure.

Reference is made to FIG. 2 again. In operation S250, the text content is displayed with the warping method. Reference is made to FIG. 10. FIG. 10 is a flowchart illustrating the operation S250 as illustrated in FIG. 2 in accordance with some embodiments of the present disclosure. As illustrated in FIG. 10, the operation S250 includes operations S252 to S258. In some embodiments, operation S250 is performed by the processor 130 as illustrated in FIG. 1.

In operation S252, a warping operation is performed to the first text image to generate a corrected text image. Warping operation is used for correcting image distortion. The warping operation performed in operation S252 only apply to the text image, for example, the text image TI1 as illustrated in FIG. 4.

In operation S254, the warping operation is performed to the first image to generate a corrected image. The warping operation performed in operation S254 is applied to the image, for example, the image 400 as illustrated in FIG. 4.

In operation S256, the corrected text image and the corrected image are combined to obtain a pass through image. For example, in some embodiments, the image 400 and the text image TI1 are combined to obtain the pass through image.

In operation S258, the pass through image is displayed by the display circuit. For example, in some embodiments, the pass through image is displayed by the display circuit 150 as illustrated in FIG. 1.

Through the operations of various embodiments described above, an image displaying method, an electronic device, and a non-transitory computer readable storage medium are implemented. By extracting feature points from the text region and creating a virtual surface according to the feature points, the electronic device can display a virtual image with the text content appending to the virtual surface. The SLAM system of the electronic device logs both the feature points and the virtual surface into the mixed reality environment coordinate system and associates the feature points and the virtual surface with the text content. When the user moves far away from the text region, the electronic device can correctly display the text content even the text content is challenging to recognize. Moreover, the electronic device can modify or update the text content, the feature points, and the virtual surface when more accurate text content is obtained, so as to increase the accuracy of the stored data.

Furthermore, by applying warping operation to the text image, the text content resolution can be enhanced by recognizing the stroke of the text, and the text's structure can be maintained, which makes the text content readable in a pass through image.

It should be noted that in the operations of the above-mentioned image displaying method 200, no particular sequence is required unless otherwise specified. Moreover, the operations may also be performed simultaneously or the execution times thereof may at least partially overlap.

Furthermore, the operations of the image displaying method 200 may be added to, replaced, and/or eliminated as appropriate, in accordance with various embodiments of the present disclosure.

Various functional components or blocks have been described herein. As will be appreciated by persons skilled in the art, the functional blocks will preferably be implemented through circuits (either dedicated circuits, or general purpose circuits, which operate under the control of one or more processing circuits and coded instructions), which will typically include transistors or other circuit elements that are configured in such a way as to control the operation of the circuitry in accordance with the functions and operations described herein.

Although the present disclosure has been described in considerable detail with reference to certain embodiments thereof, other embodiments are possible. Therefore, the scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image displaying method, comprising:
capturing a first image of a real space by a camera based on a first viewing direction when the camera is located at a first camera position, wherein the first image comprises a first text image;
detecting a text region according to the first image by a processor, wherein the text region comprises the first text image;
recognizing the first text image to obtain a first text content by the processor;
obtaining a plurality of first feature points of the text region according to the first image by the processor;
creating a first virtual surface according to the plurality of first feature points by the processor; and
displaying a first virtual image with the first text content appending to the first virtual surface by a display circuit;
wherein the image displaying method further comprises:
storing the plurality of first feature points, the first text content, and the first virtual surface in a memory;
capturing a second image of the real space by the camera based on a second viewing direction when the camera is located at a second camera position, wherein the second image comprises the text region and a second text image; and
updating the plurality of first feature points, the first text content, and the first virtual surface stored in the memory according to the second image when a first ratio between the first text image and the first image is smaller than a second ratio between the second text image and the second image.

2. The image displaying method of claim 1, further comprising:
establishing a mixed reality environment coordinate system in correspondence to the real space according to a plurality of space feature points of the real space;
obtaining a plurality of first positions of the plurality of first feature points in the mixed reality environment coordinate system; and
creating the first virtual surface according to the plurality of first positions of the plurality of first feature points.

3. The image displaying method of claim 1, wherein updating the plurality of first feature points, the first text content, and the first virtual surface stored in the memory according to the second image when the first ratio between the first text image and the first image is smaller than the second ratio between the second text image and the second image comprises:
recognizing the second text image of the second image to obtain a second text content;
obtaining a plurality of second feature points of the text region according to the second image;
creating a second virtual surface according to the plurality of second feature points; and replacing the plurality of first feature points, the first text content, and the first virtual surface stored in the memory by the plurality of second feature points, the second text content, and the second virtual surface when the first ratio between the first text image and the first image is smaller than the second ratio between the second text image and the second image.

4. The image displaying method of claim 1, further comprising:

replacing the first text content stored in the memory by a second text content based on the second image when a second reliability of the second text content of the second image is higher than a first reliability of the first text content.

5. The image displaying method of claim 1, further comprising:

displaying a second virtual image with the first text content on the first virtual surface by the display circuit when the second ratio between the second text image and the second image is smaller than a ratio threshold.

6. The image displaying method of claim 1, further comprising:

performing a warping operation to the first text image to generate a corrected text image;

performing the warping operation to the first image to generate a corrected image;

combining the corrected text image and the corrected image to obtain a pass through image; and displaying the pass through image by the display circuit.

7. An electronic device, comprising:

a camera, configured to capture a first image of a real space based on a first viewing direction when the camera is located at a first camera position, wherein the first image comprises a first text image;

a processor, coupled to the camera, configured to:

detect a text region according to the first image, wherein the text region comprises the first text image;

recognize the first text image to obtain a first text content;

obtain a plurality of first feature points of the text region according to the first image; and create a first virtual surface according to the plurality of first feature points; and a display circuit, coupled to the processor, configured to display a first virtual image with the first text content appending to the first virtual surface;

wherein the processor is further configured to:

store the plurality of first feature points, the first text content, and the first virtual surface in a memory; and update the plurality of first feature points, the first text content, and the first virtual surface stored in the memory according to a second image of the real space when a first ratio between the first text image and the first image is smaller than a second ratio between a second text image and the second image;

wherein the second image is captured by the camera based on a second viewing direction when the camera is located at a second camera position, wherein the second image comprises the text region and the second text image.

8. The electronic device of claim 7, wherein the processor is further configured to:

establish a mixed reality environment coordinate system in correspondence to the real space according to a plurality of space feature points of the real space;

obtain a plurality of first positions of the plurality of first feature points in the mixed reality environment coordinate system; and create the first virtual surface according to the plurality of first positions of the plurality of first feature points.

9. The electronic device of claim 7, wherein the processor is further configured to:

recognize the second text image of the second image to obtain a second text content;

obtain a plurality of second feature points of the text region according to the second image;

create a second virtual surface according to the plurality of second feature points; and replace the plurality of first feature points, the first text content, and the first virtual surface stored in the memory by the plurality of second feature points, the second text content, and the second virtual surface when the first ratio between the first text image and the first image is smaller than the second ratio between second text image and the second image.

10. The electronic device of claim 7, wherein the processor is further configured to:

replace the first text content stored in the memory by a second text content based on the second image when a second reliability of the second text content of the second image is higher than a first reliability of the first text content.

11. The electronic device of claim 7, wherein the processor is further configured to:

display a second virtual image with the first text content on the first virtual surface by the display circuit when the second ratio between the second text image and the second image of the real space is smaller than a ratio threshold.

12. The electronic device of claim 7, wherein the processor is further configured to:

perform a warping operation to the first text image to generate a corrected text image;

perform the warping operation to the first image to generate a corrected image;

combine the corrected text image and the corrected image to obtain a pass through image; and display the pass through image by the display circuit.

13. A non-transitory computer readable storage medium, wherein the non-transitory computer readable storage medium comprises one or more computer programs stored therein, and the one or more computer programs can be executed by one or more processors so as to be configured to operate an image displaying method, wherein the image displaying method comprises:

capturing a first image of a real space based on a first viewing direction of a camera when the camera is located at a first camera position, wherein the first image comprises a first text image;

detecting a text region according to the first image, wherein the text region comprises the first text image;

recognizing the first text image to obtain a first text content;

obtaining a plurality of first feature points of the text region according to the first image;

creating a first virtual surface according to the plurality of first feature points; and displaying a first virtual image with the first text content on the first virtual surface;

wherein the image displaying method further comprises:

storing the plurality of first feature points, the first text content, and the first virtual surface in a memory;

capturing a second image of the real space by the camera based on a second viewing direction when the camera is located at a second camera position, wherein the second image comprises the text region and a second text image; and updating the plurality of first feature points, the first text content, and the first virtual surface stored in the memory according to the second image when a first ratio between the first text image and the first image is smaller than a second ratio between the second text image and the second image.

14. The non-transitory computer readable storage medium of claim 13, wherein the image displaying method further comprises:

establishing a mixed reality environment coordinate system in correspondence to the real space according to a plurality of space feature points of the real space;

obtaining a plurality of first positions of the plurality of first feature points in the mixed reality environment coordinate system; and creating the first virtual surface according to the plurality of first positions of the plurality of first feature points.

\* \* \* \* \*